United States Patent

Kartchner et al.

[15] 3,665,472

[45] May 23, 1972

[54] TWO-WAY COMMUNICATION SYSTEM EMPLOYING TWO-CLOCK FREQUENCY PSEUDO-NOISE SIGNAL MODULATION

[72] Inventors: Earl M. Kartchner, Salt Lake City; Gary R. Van Horn, Granger, both of Utah; Richard A. Wallace, Phoenix, Ariz.

[73] Assignee: Sperry Rand Corporation, New York, N.Y.

[22] Filed: Oct. 8, 1969

[21] Appl. No.: 864,596

[52] U.S. Cl. ....................343/175, 325/42, 325/65

[51] Int. Cl. ....................H04b 1/38

[58] Field of Search....................325/21, 42, 58, 65, 22, 30; 343/175, 180, 179; 178/66 R, 67

[56] References Cited

UNITED STATES PATENTS

| | | | |
|---|---|---|---|
| 3,305,636 | 2/1967 | Webb | 325/47 |
| 3,426,278 | 1/1969 | Van Der Valk | 343/179 |
| 3,432,619 | 3/1969 | Blasbalg | 325/22 |

*Primary Examiner*—Robert L. Richardson
*Assistant Examiner*—George G. Stellar
*Attorney*—Kenneth T. Grace, Thomas J. Nikolai and John P. Dority

[57] ABSTRACT

A digital two-way communication system utilizing RF transmissions that are phase-shift-keyed (PSK) by binary pseudo-noise (PN) code generators operating at different clock rates. Transmissions in the first and second directions are modulated by composite PN code generators operating at different first and second clock frequencies $f_1$ and $f_2$, respectively, where $f_1 = Nf_2$, with $N$ being a positive integer having no factors in common with the lengths of the component PN codes from which the composite is formed. The binary digital data signals that are to be transmitted in either direction modulate a binary PN code which is a composite code generated from a plurality of component PN codes. Each of these data-modulated composite PN codes, which are generated at clock frequencies $f_1$ and $f_2$, respectively, modulates, in turn, an RF carrier signal.

By having the two communication stations transmit and receive at different PN clock frequencies, equipment limitations that restrict transmitter performance in the second direction need not limit performance in the first direction, thereby allowing a higher clock frequency $f_1$, in the first direction and subsequent lower power required at the receiver at the other end for the same SNR out of the receiver.

3 Claims, 16 Drawing Figures

INVENTORS
GARY R. VAN HORN
RICHARD A. WALLACE
EARL M. KARTCHNER
BY Kenneth T. Grace
ATTORNEY

TWO-WAY COMMUNICATION SYSTEM EMPLOYING TWO-CLOCK FREQUENCY PSEUDO-NOISE SIGNAL MODULATION

BACKGROUND OF THE INVENTION

The present invention relates to communication systems incorporating pseudo-noise (PN) modulation of radio-frequency (RF) carrier signals. Such systems are well-known and have been utilized because of their desirable spread-spectrum characteristics, including efficient use of signal energy, low power transmission and interference rejection. Such well-known systems generally include at least two communicating stations of substantially similar composition including clock generators that drive two pseudo-noise code generators each separately driving an associated receiver and transmitter which, in turn, are coupled by a transmit/receive switch or diplexer to an appropriate antenna. This invention has particular reference to two-way communications involving a transponder as one of the two communicating stations.

The transmit and receive pseudo-noise code generators are generally of the same design, providing the desired pseudo-noise codes in a manner well-known in the art. The linear maximal-length or M-sequence codes are one class of PN codes. In the case of a transponder, a single pseudo-noise code generator may drive both transmitter and receiver. Present two-way communications systems using PN modulation are designed to operate both receiver and transmitter PN code generators at essentially the same clock frequency. In the case of a remote transponder, cost or weight restrictions may demand a transmitter that is limited in its ability to handle wide-bandwidth, high clock-frequency PN modulation. Generally, the wider the bandwidth of a PN-modulated signal the better its performance. When PN clock frequencies are required to be the same in both transmission directions, this limits performance in the base-or ground-to-transponder direction to that which is possible in the transponder-to-ground direction, regardless of actual equipment capacity in the first direction.

SUMMARY OF THE INVENTION

The present invention is directed toward an improved two-way communication system that employs two-clock-frequency, pseudo-noise signal modulation. Transmission between the two transmit/receive stations, e.g., a first ground station and a second airborne station or transponder, may employ the well-known phase-shift-keyed (PSK) modulation of the carrier signal; see the text "Data Transmission," Bennett & Davey, McGraw-Hill, 1965, pp 26–31. For purposes of illustration, PSK will be assumed to be the technique by which the RF carrier is pseudo-noise (PN) modulated.

The RF carriers going in each direction may be of different frequencies to allow simultaneous reception and transmission of signals by a common antenna. These carrier frequencies, however, are not the ones under discussion here, and are not to be confused with the clock frequencies, $f_1$ and $f_2$, at which the PN code generators are driven.

In the second station there is provided a composite pseudo-noise binary code generator driven by a clock generator of frequency $f_1$; see the text "Shift Register Sequences", S. W. Golomb, Holden-Day, 1967, pp 75–82. That is, the width of an individual bit in the code is $1/f_1$. The $f_1$ clock generator drives a plurality of pseudo-noise binary code generators providing a like plurality of component codes of clock frequency $f_1$ which are coupled not only to a first code combiner that combines the component codes into a composite code but to a second code combiner through associated sample-and-hold devices. The $f_1$ clock generator, through a frequency divider, divides the $f_1$ clock signal by a positive integer, i.e., $f_1/N=f_2$, driving the sample-and-hold devices at the frequency $f_2$ whereby the set of component codes are sampled at the frequency $f_2$ providing, as output signals, composite codes of clock frequency $f_2$, that is, having bit widths $1/f_2 = N/f_1$. The positive integer $N$, by which clock frequency $f_1$ is divided to produce clock frequency $f_2$, is relatively prime to the cyclic lengths, in bits, of the component PN codes that are combined by some Boolean function to produce the composite PN code. By relatively prime is meant that the number N and the numbers representing the lengths of the component codes have no common factors. The composite code of clock frequency $f_1$ from the first code combiner is coupled to the receiver where synchronization, acquisition and demodulation of the received signal is performed. The composite code of clock frequency $f_2$ from the second code combiner is coupled to the transmitter where modulation of the carrier signal is performed in the well-known manner by phase-shift-keying.

The first station, in contrast, includes separate sets of component code generators, each set similar to the set in the second station, for the transmitter and receiver circuits. Each set is driven at the respective frequencies of $f_1$ and $f_2$ by a clock generator of frequency $f_1$ and another clock generator of frequency $f_2$, i.e., $f_1/N = f_2$. Separate clocks and code generators are necessary in the ground station so that transponder range may be determined by measuring the two-way RF propagation delay time indicated by the code phase difference between the transmitter and receiver PN code generators when the two stations are synchronized. Separate receiver and transmitter code combiners, similar to those in the second station, generate the associated composite codes, similar to those in the second station, directly driving the receiver and transmitter. The composite code of frequency $f_2$ from the receiver code combiner is coupled to the receiver where synchronization, acquisition and demodulation of the received signal is performed, as in the second station receiver whose PN code is generated at a clock frequency $f_1$. The composite code, of clock frequency $f_1$, from the transmitter code combiner is coupled to the transmitter where modulation of the carrier signal is performed, as in the modulation of the carrier signal by the second station transmitter whose PN code is generated at a clock frequency $f_2$. By utilizing two different pseudo-noise clocks (a relatively wide-bandwidth PN-modulated transmission from the first station as compared to the narrower bandwidth PN-modulated transmission from the second station), the power output of the first station transmitter may remain the same while substantially increasing the desired anti-jam, covert, acquisition and reception performance at the receiver of the second station.

DESCRIPTION OF THE PREFERRED EMBODIMENTS

Figure 1:
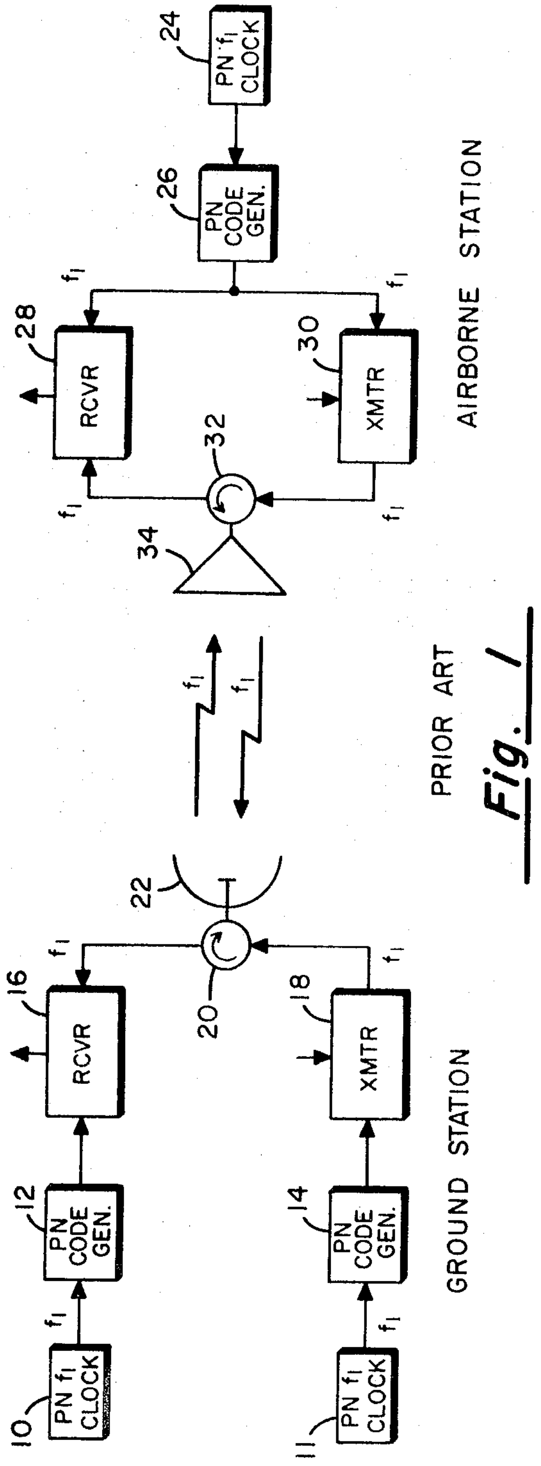
FIG. 1 is an illustration of a block diagram of a prior art communication system.

With particular reference to FIG. 1 there is presented an illustration of a block diagram of a prior art communication system. Such system includes at least two communicating stations of substantially similar compositions, identified as the ground station and the airborne station. The ground station includes two pseudo-noise (PN) clock generators 10, 11 of frequency $f_1$ that drive two associated PN code generators 12, 14 each of which separately drive an associated receiver 16 and transmitter 18 which, in turn, are coupled by a transmit/receive switch 20 to an appropriate antenna 22. The airborne station includes a PN clock generator 24 of frequency $f_1$ that drives a single PN code generator 26 which drives an associated receiver 28 and transmitter 30 which, in turn, are coupled by a transmit/receive switch 32 to an appropriate antenna 34. Transmission between the ground station and the airborne station is at a carrier signal of a radio frequency (RF) that is orders of magnitude greater than that of the bidirectional PN clock frequency $f_1$.

Figure 2:
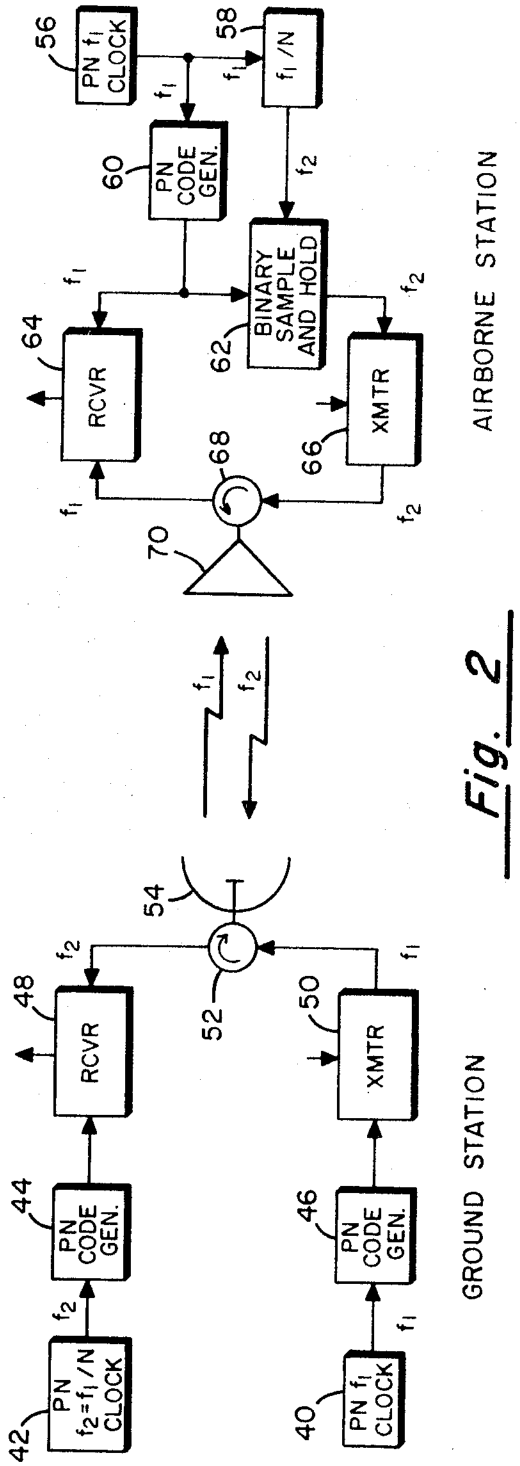
FIG. 2 is an illustration of a block diagram of a communication system incorporating the present invention.

With particular reference to FIG. 2 there is presented an illustration of a block diagram of a communication system incorporating the present invention. As in the embodiment of FIG. 1, the communication system includes a ground station and an airborne station. However, in contrast to the embodiment of FIG. 1 where transmission between the ground station and the airborne station is at a bidirectional PN clock frequency of $f_1$, in the embodiment of FIG. 2 transmission by the ground station to the airborne station is at a first PN clock frequency $f_1$ while transmission by the airborne station to the ground station is at a second PN clock frequency $f_2$ where $f_1 = Nf_2$ with N being a positive integer relatively prime with respect to the component PN code lengths. The RF carrier signal frequency is orders of magnitude greater than that of the higher PN clock frequency $f_1$. In addition, the RF carrier signal frequency may be different for each transmission direction, e.g., a higher frequency carrier signal may be PSK modulated by a PN signal having a high clock frequency $f_1$ while a lower frequency carrier signal may be PSK modulated by a PN signal having a lower clock frequency $f_2$.

The ground station includes a PN $f_1$ clock generator 40 which is coupled to PN code generator 46. A PN $f_2$ clock generator 42 drives PN code generator 44. PN code generator 44 and PN code generator 46 each separately drive an associated receiver 48 and transmitter 50, respectively, which, in turn, are coupled by a transmit/receive switch, or diplexer, 52 to an appropriate antenna 54.

In the airborne station there is provided a two-frequency PN generator comprised of PN $f_1$ clock generator 56, frequency divider 58, PN code generator 60 and binary sample-and-hold device 62. PN $f_1$ clock generator 56 drives, in parallel, PN code generator 60 and frequency divider 58 which, in turn, drives binary sample-and-hold device 62. PN code generator 60 drives, in parallel, receiver 64 and binary sample-and-hold device 62 which, in turn, is sampled by frequency divider 58 at a frequency $f_1/N = f_2$. Binary sample-and-hold device 62, in turn, drives transmitter 66; receiver 64 and transmitter 66 are, in turn, coupled by a transmit/receive switch, or diplexer, 68 to an appropriate antenna 70.

Figure 3:
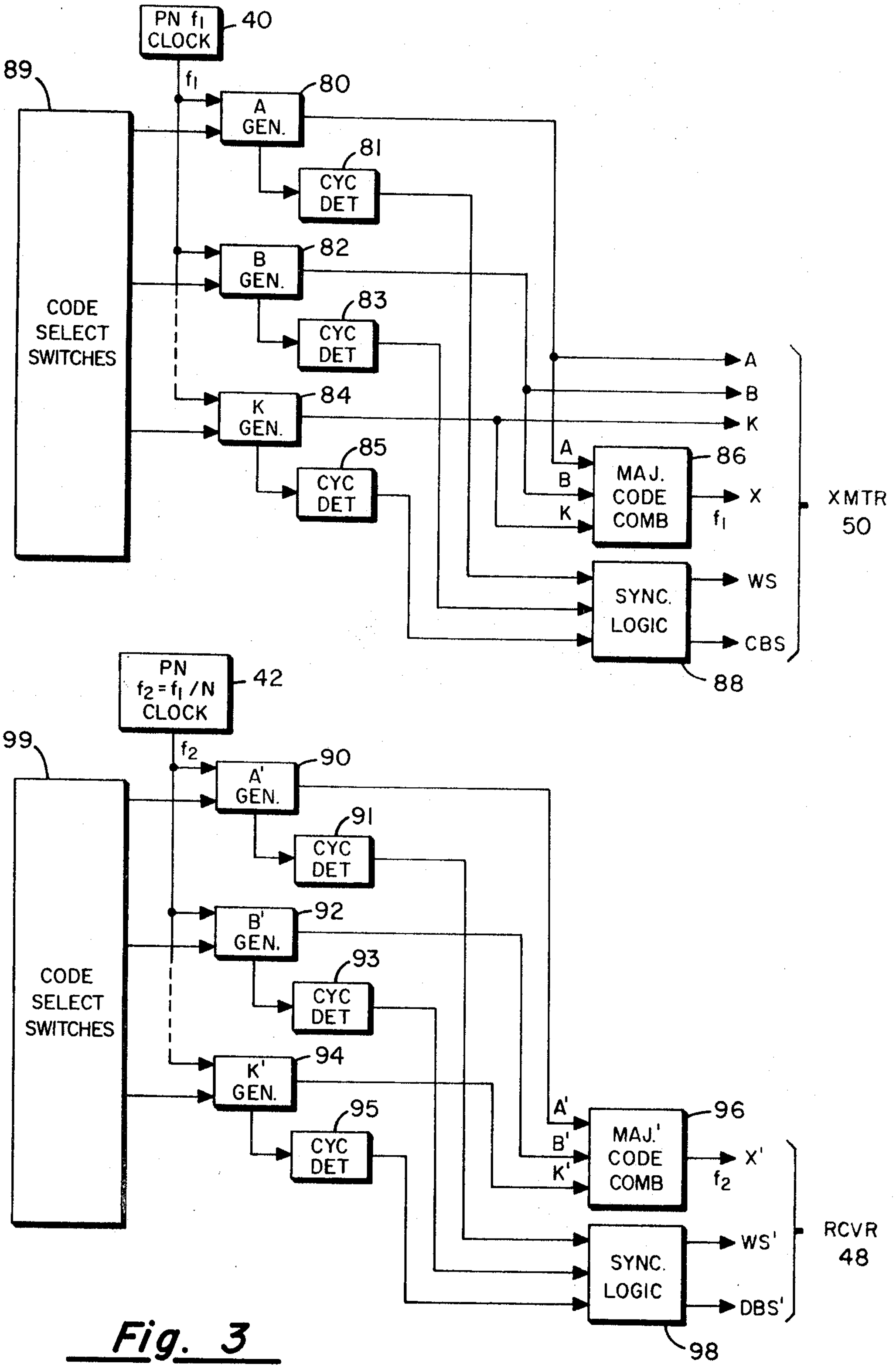
FIG. 3 is an illustration of a block diagram of the two clock frequency PN generator of the ground station of FIG. 2.
Figure 4:
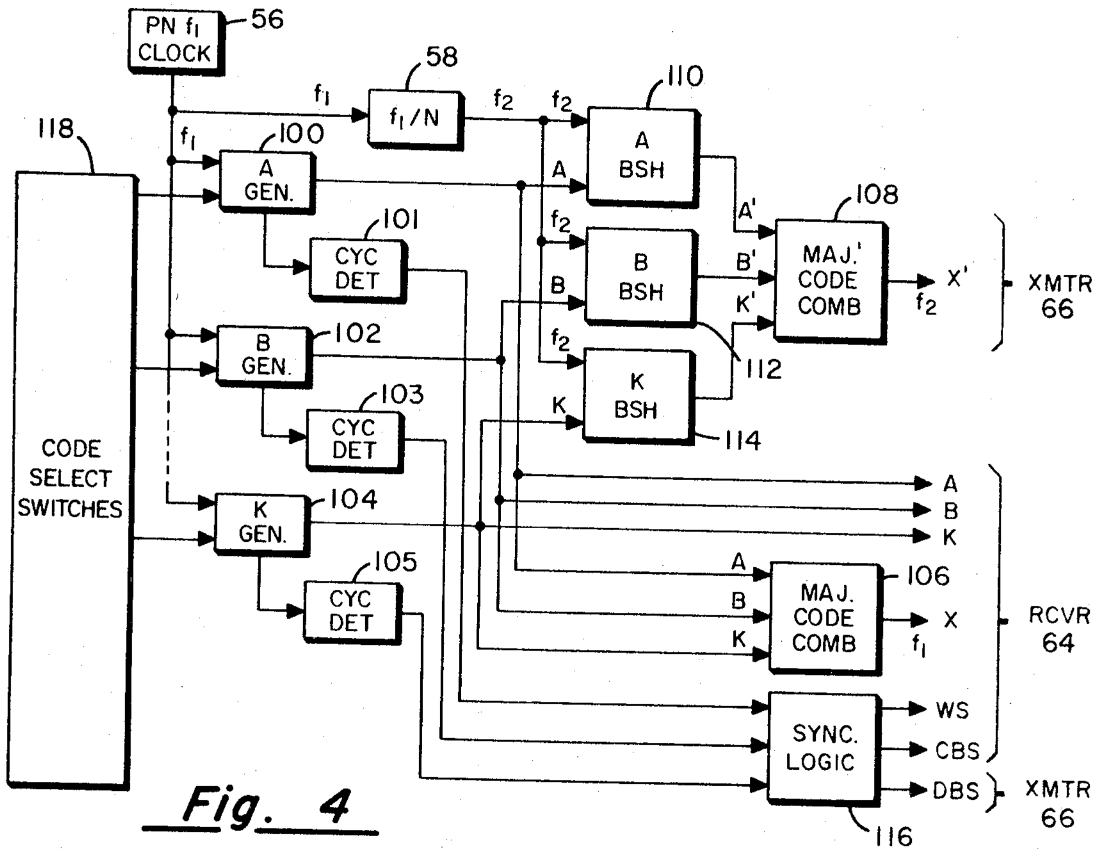
FIG. 4 is an illustration of a block diagram of the two-clock frequency PN generator of the airborne station of FIG. 2.

With particular reference to FIG. 3 and FIG. 4 there are presented illustrations of the block diagrams of the two separate PN code generators of the ground station and the two-clock-frequency PN code generator of the airborne station, respectively, of FIG. 2. The PN code generators of FIG. 3 and 4 generate:

a plurality of PN component codes A, B, — K of lengths $L_A$, $L_B$, — $L_K$ at a clock frequency $f_1$ which component codes are combined in a code combiner to generate a PN composite code X of a length $L_X$ which is a product of the lengths $L_A$, $L_B$, — $L_K$ of the component codes and is of a clock frequency $f_1$;

a plurality of PN component codes A', B', — K' of lengths $L_A'$, $L_B'$, --- $L_K'$ at a clock frequency $f_2$ which component codes are combined in a code combiner to generate a PN composite code X' of a length $L_X'$ which is the product of the lengths $L_A'$, $L_B'$, — $L_K'$ of the component codes and is of a clock frequency $f_2$.

The composite code X of clock frequency $f_1$ is utilized:

in the ground station by the transmitter 50 for PN modulation of the transmitted carrier signal at a clock frequency $f_1$, and in the airborne station by the receiver 64 for synchronization, acquisition and PN demodulation of the received signal at a clock frequency $f_1$.

The composite code X' of clock frequency $f_2$ is utilized:

in the airborne station by the transmitter 66 for PN modulation of the transmitted carrier signal at a clock frequency of $f_2$; and in the ground station by the receiver 48 for synchronization, acquisition and PN demodulation of the received signal at a clock frequency of $f_2$.

In the two PN code generators of FIG. 3, PN $f_1$ clock generator 40 drives a plurality of PN component code generators 80, 82, — 84. Code generators 80, 82, — 84 generate associated PN component codes A, B, — K of lengths $L_A$, $L_B$, — $L_K$ of a clock frequency $f_1$. Component codes A, B, — K are, in turn, coupled in parallel to MAJ code combiner 86 which generates a PN MAJ composite code X of a length $L_X$ which is the product of the lengths $L_A$, $L_B$, — $L_K$ of the component codes and of a clock frequency $f_1$. Composite code X drives transmitter 50 for PN modulation of the transmitted carrier signal at a clock frequency of $f_1$.

Cycle detectors 81, 83, – 85, which are coupled to their associated code generators 80, 82, – 84, respectively, provide synchronization for data sampling and data modulation of the PN signal, coupling their associated trigger signal to synchronization logic 88 which, in turn, generates appropriate word sync (WS) signals and command bit sync (CBS) signals, which are, in turn, coupled to transmitter 50. Code select switches 89 are utilized by, and are a part of, code generators 80, 82, – 84 to generate a predetermined PN component code as will be more fully discussed with particular reference to FIGS. 5*a*, 5*b*, 5*c*.

PN $f_2$ clock generator 42 drives, in parallel, a plurality of PN component code generators 90, 92, – 94. Code generators 90, 92, – 94 generate associated PN component codes A', B', – K' of lengths $L_A'$, $L_B'$, – $L_K'$ of a clock frequency $f_2$, where $f_2 = f_1/N$. $N$ is a positive integer relatively prime to $L_A$, $L_B$, – $L_K$. Component codes A', B', – K', are, in turn, coupled in parallel to MAJ' code combiner 96 which generates a PN MAJ' composite code X' of a length $L_X'$ which is the product of component lengths $L_A'$, $L_B'$, – $L_K$ and is of a clock frequency $f_2$. Composite code X' drives receiver 48 for PN demodulation of the received carrier signal at a clock frequency $f_2$.

In a manner similar to that described above, cycle detectors 91, 93, – 95, which are coupled to their associated code generators 90, 92, – 94, respectively, provide synchronization for data demodulation, coupling their associated trigger signals to synchronization logic 98 which generates appropriate word sync (WS') signals and data bit synchronization (DBS') signals, which are coupled to receiver 48. Code select switches 99, in a manner similar to code select switches 89 as discussed above, are utilized by, and are a part of, code generators 90, 92, – 94 to generate a predetermined PN code sequence as will be more fully discussed with particular reference to FIGS. 5*a*, 5*b*, 5*c*.

The two-clock-frequency PN generator of FIG. 4 is an improved arrangement of the two clock frequency PN generator of FIG. 3, performing the same functions with fewer component parts providing a less expensive, light-weight version for the airborne station of FIG. 2. In the two-clock-frequency PN generator of FIG. 4, PN $f_1$ clock generator 56 drives, in parallel, a plurality of PN component code generators 100, 102, – 104 and frequency divider 58. Code generators 100, 102, – 104 generate associated PN component codes A, B, – K of lengths $L_A$, $L_B$, – $L_K$ at a clock frequency $f_1$ in a manner similar to that discussed with particular reference to FIG. 3. Each of the component codes A, B, – K are, in turn, coupled in parallel to MAJ code combiner 106 and associated binary sample-and-hold devices 110, 112, and 114, respectively. Binary sample-and-hold devices 110, 112, – 114 sample, at a frequency $f_2$, the respectively associated component codes A, B, – K which were generated at a clock frequency $f_1$ and generate, at a clock frequency $f_2$, respectively associated PN component codes A', B', – K', of lengths $L_A'$, $L_B'$, – $L_K'$ where $f_2 = f_1/N$. Component codes A', B', --- K' are, in turn, coupled in parallel to MAJ' code combiner 108 which generates a PN MAJ' composite code X' of a length $L_X \times L_A \times L_B \times - L_K$ at a clock frequency $f_2$. Composite code X' drives transmitter 66 for PN modulation of the transmitted carrier signal at a clock frequency $f_2$.

In a manner similar to that of the above discussed arrangement of FIG. 3, cycle detectors 101, 103, – 105, which are coupled to their associated code generators 100, 102, –104, respectively, provide synchronization for data sampling and data modulation and demodulation of the PN signals X and X', coupling their associated trigger signal to synchronization logic 116 which generates appropriate word sync (WS) signals and command bit synchronization (CBS) signals which are coupled to receiver 64 and data bit synchronization (DBS) signals which are coupled to transmitter 66. Code signals 118 are utilized by, and are a part of, code generators 100, 102, – 104 to generate a predetermined PN code as will be more fully discussed with particular reference to FIGS. 5a, 5b, 5c.

Prior to discussing, in detail, the PN component code generators of FIGS. 5a, 5b, 5c, reference will be made back to the preferred embodiment of the present invention as illustrated in FIG. 2. By utilizing a two-clock-frequency pseudonoise modulated transmission, (e.g., a different clock frequency for each of the two directions of communication) there are provided many advantages over prior art arrangements such as illustrated in FIG. 1. One advantage of a two-way communication system utilizing PN modulation at different clock frequencies in either of the two directions of transmission, is the possibility of trading-off transmission carrier signal power for PN clock frequency. With reference to FIG. 6, there is presented an illustration of a plot of PN clock frequency versus PN-modulated carrier signal power. FIG. 6 illustrates that for a given signal-to-noise ratio out of the receiver, i.e., $S/N=$ constant, the PN clock frequency may be increased while decreasing the PN-modulated carrier signal power into the receiver. Thus, by transmitting from the ground station to the airborne station at a higher PN clock frequency $f_1$ and by transmitting from the airborne station to the ground station at a lower clock frequency $f_2$ the same receiver output signal-to-noise ratios may be maintained while substantially decreasing the power requirements of the ground transmitter as compared to those of the airborne transmitter.

Figure 7A:
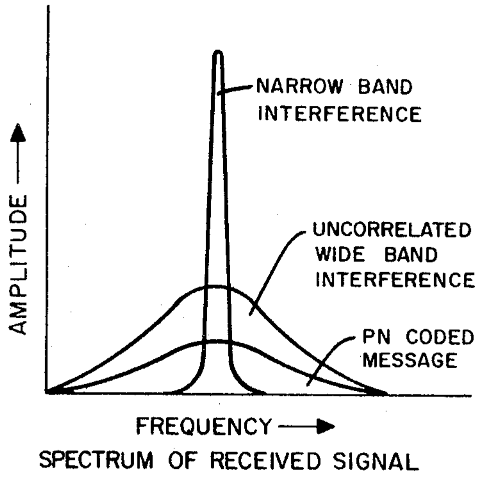
FIGS. 7*a*, 7*b* are illustrations of plots of the interference rejecting characteristics of the received and of the PN code-demodulated signal spectrums, respectively, versus signal amplitude.
Figure 7B:
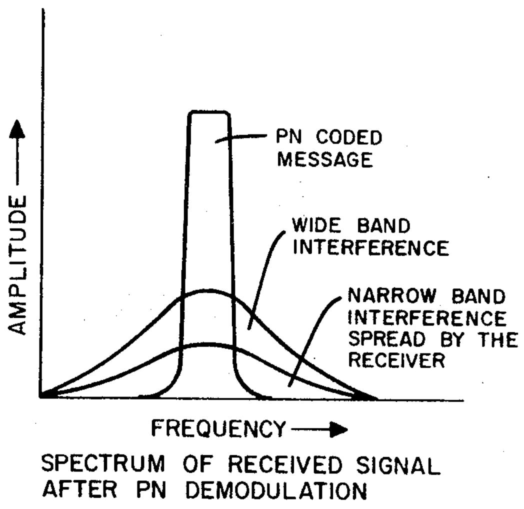

Additionally, by utilizing the two clock-frequency PN generators of FIGS. 3 and 4 there is provided a two-way spread-spectrum communication system having an improved resistance to narrow band interference in one direction even though its performance is restricted by equipment limitations in the other direction. With particular reference to FIGS. 7a, 7b there are presented illustrations of plots of the interference characteristics of the received signal and of the PN demodulated signal spectrums, respectively, versus transmitted signal amplitude. Modulation of the transmitted carrier signal by a binary sequence, such as the MAJ code sequence X, is a form of scrambling that spreads the transmitted signal spectrum such as illustrated in FIG. 7a. By demodulating the received signal by the known MAJ code sequence X the received message spectrum is collapsed while, at the same time, any CW interference that is present is spread, while uncorrelated broadband noise is not collapsed. The received signal may then be separated by a narrow band filter. Such spread-spectrum characteristics of the received signal are illustrated in FIG. 7b. For a further discussion of such techniques see the publication "An Introduction To Pseudo Noise Modulation" J. P. Chandler, AD 479308.

Figure 5A:
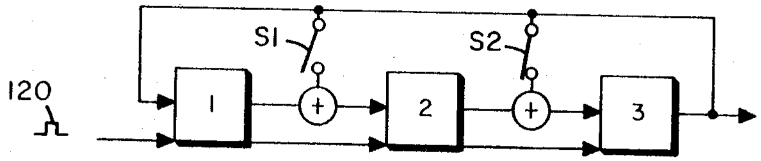
FIGS. 5*a*, 5*b*, 5*c* are diagrammatic illustrations typical of the PN component code generators utilized in FIGS. 3 and 4.
Figure 5B:
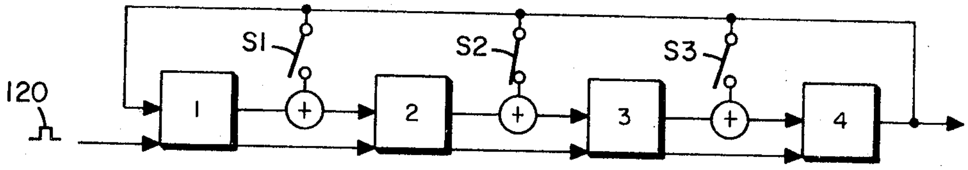
Figure 5C:
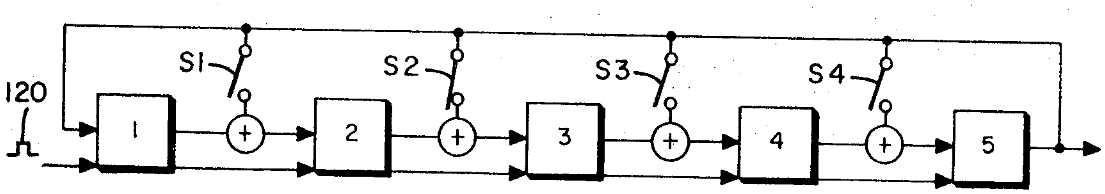
Figure 5D:
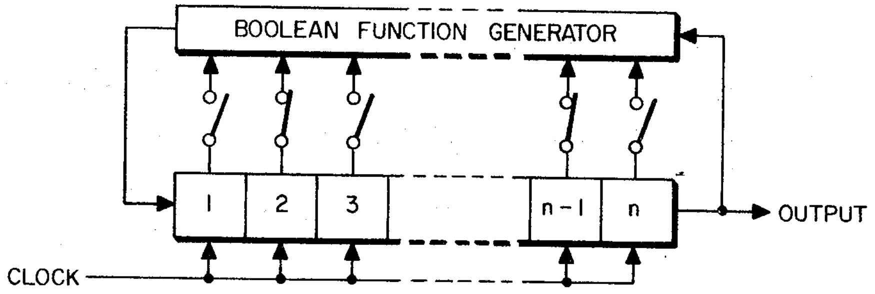
FIG. 5*d* is a more generalized block diagram of such generators.
Figure 6:
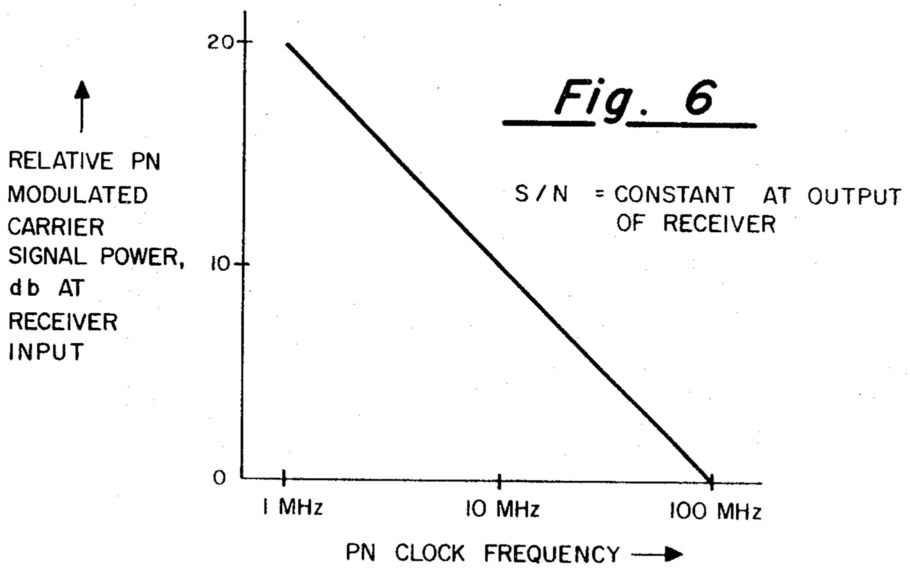
FIG. 6 is an illustration of a plot of PN clock frequency versus relative PN-modulated carrier signal power required at the receiver input to maintain a constant SNR at receiver output.

With particular reference to FIGS. 5a, 5b, 5c there are presented diagrammatic illustrations of typical PN component code generators that could be utilized in FIGS. 3 and 4; a more generalized block diagram is shown in FIG. 5d. Utilizing the two-clock-frequency PN generator of FIG. 4 as an illustrative example, the PN code generators of FIG. 5a, 5b, 5c may be considered to be analogous to PN code generators 100, 102 and 104. Such PN code generators consist essentially of a basic shift register to which modulo-two adders have been added. These modulo-two adders, which perform the exclusive-OR logic function, are inserted between adjacent stages of the shift register while the outputs from the stages form the selective inputs to the modulo-two adders so that single or multiple closed feedback loops are formed thereby. When the shift register is clocked in the normal manner, the output from any stage of the shift register (normally the right hand stage) forms a digital PN coded sequence. In the general case, the ensuing digital coded sequence depends on both the feedback connections and on the initial loading (or content) of the shift register with the ensuing digital coded sequence being generated at a frequency established by the shift register clock signal 120, which in the embodiment of FIG. 4 is a PN clock of frequency $f_1$. For a thorough discussion of the theory of operation of such PN code generators see the publication "Introduction To Linear Shift Register Generated Sequences" T. G Birdsall et al., AD 225380.

With particular reference to Tables A, B, C, there are illustrated the contents of the respectively associated shift registers of FIGS. 5a, 5b, 5c, respectively, at the respectively associated bit times. As noted in Tables A, B, C, the shift register stages of the PN component code generators of FIGS. 5a, 5b, 5c have all their stages 1 through n initially loaded with all "1"'1 through ($2^n - 1$)
the last, or nth, stage is caused to emit a linear maximal-length (M) sequence as is well-known in the art; see the publication "Study of Linear Sequence Generators", C. C. Hoopes et al., AD 488718.

TABLE A

| | | STAGE 1 | 2 | 3 |
|---|---|---|---|---|
| B | 1 | 1 | 1 | 1 |
| I | 2 | 1 | 1 | 0 |
| T | 3 | 0 | 1 | 1 |
| | 4 | 1 | 0 | 0 |
| T | 5 | 0 | 1 | 0 |
| I | 6 | 0 | 0 | 1 |
| M | 7 | 1 | 0 | 1 |
| E | 1 | 1 | 1 | 1 |

TABLE B

| | | STAGE 1 | 2 | 3 | 4 |
|---|---|---|---|---|---|
| B | 1 | 1 | 1 | 1 | 1 |
| I | 2 | 1 | 0 | 1 | 1 |
| T | 3 | 1 | 0 | 0 | 1 |
| | 4 | 1 | 0 | 0 | 0 |
| | 5 | 0 | 1 | 0 | 0 |
| T | 6 | 0 | 0 | 1 | 0 |
| I | 7 | 0 | 0 | 0 | 1 |
| M | 8 | 1 | 1 | 0 | 0 |
| E | 9 | 0 | 1 | 1 | 0 |
| | 10 | 0 | 0 | 1 | 1 |
| | 11 | 1 | 1 | 0 | 1 |
| | 12 | 1 | 0 | 1 | 0 |
| | 13 | 0 | 1 | 0 | 1 |
| | 14 | 1 | 1 | 1 | 0 |
| | 15 | 0 | 1 | 1 | 1 |
| | 1 | 1 | 1 | 1 | 1 |

TABLE C

| | | STAGE 1 | 2 | 3 | 4 | 5 |
|---|---|---|---|---|---|---|
| B | 1 | 1 | 1 | 1 | 1 | 1 |
| I | 2 | 1 | 1 | 0 | 1 | 1 |
| T | 3 | 1 | 1 | 0 | 0 | 1 |

| | | | | | | |
|---|---|---|---|---|---|---|
| | 4 | 1 | 1 | 0 | 0 | 0 |
| | 5 | 0 | 1 | 1 | 0 | 0 |
| | 6 | 0 | 0 | 1 | 1 | 0 |
| | 7 | 0 | 0 | 0 | 1 | 1 |
| T | 8 | 1 | 0 | 1 | 0 | 1 |
| I | 9 | 1 | 1 | 1 | 1 | 0 |
| M | 10 | 0 | 1 | 1 | 1 | 1 |
| E | 11 | 1 | 0 | 0 | 1 | 1 |
| | 12 | 1 | 1 | 1 | 0 | 1 |
| | 13 | 1 | 1 | 0 | 1 | 0 |
| | 14 | 0 | 1 | 1 | 0 | 1 |
| | 15 | 1 | 0 | 0 | 1 | 0 |
| | 16 | 0 | 1 | 0 | 0 | 1 |
| | 17 | 1 | 0 | 0 | 0 | 0 |
| | 18 | 0 | 1 | 0 | 0 | 0 |
| | 19 | 0 | 0 | 1 | 0 | 0 |
| | 20 | 0 | 0 | 0 | 1 | 0 |
| | 21 | 0 | 0 | 0 | 0 | 1 |
| | 22 | 1 | 0 | 1 | 0 | 0 |
| | 23 | 0 | 1 | 0 | 1 | 0 |
| | 24 | 0 | 0 | 1 | 0 | 1 |
| | 25 | 1 | 0 | 1 | 1 1 | 0 |
| | 26 | 0 | 1 | 0 | 1 | 1 |
| | 27 | 1 | 0 | 0 | 0 | 1 |
| | 28 | 1 | 1 | 1 | 0 | 0 |
| | 29 | 0 | 1 | 1 | 1 | 0 |
| | 30 | 0 | 0 | 1 | 1 | 1 |
| | 31 | 1 | 0 | 1 | 1 | 1 |
| | 1 | 1 | 2 | 1 | 1 | 1 |

TABLE D

MAJ = AB + BK + AK

| A | B | K | MAJ |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Figure 8:
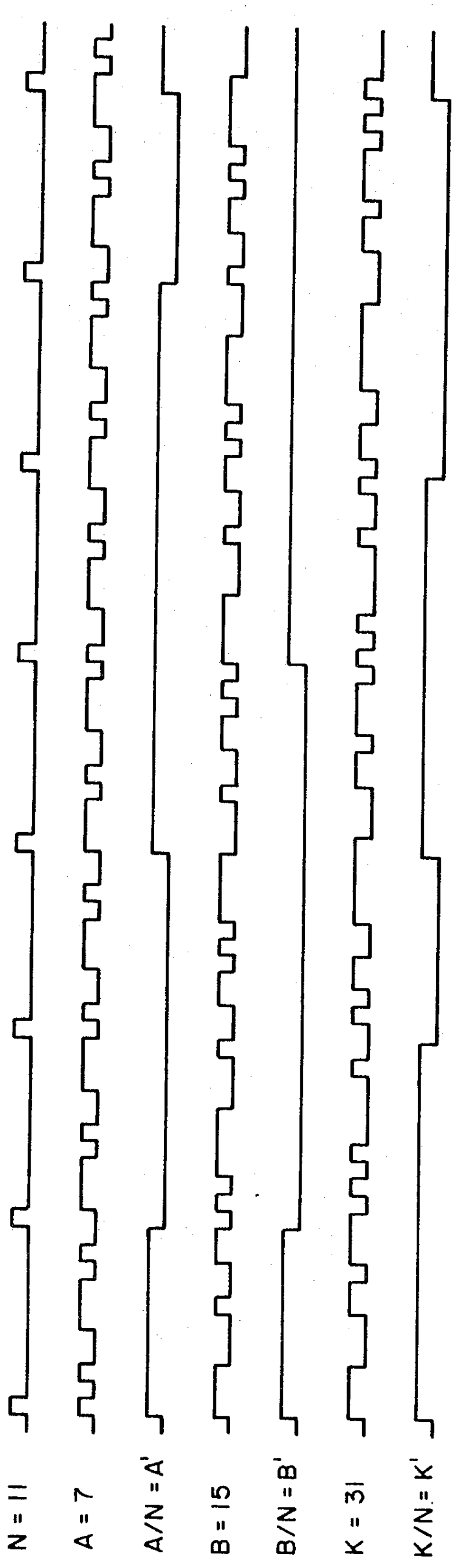
FIG. 8 is an illustration of component codes A, B, –K generated by the two clock-frequency PN generators of FIG. 4.

The interstage modulo-two adders, represented by the symbol ⊕, form inputs from the feedback path, from the last stage $n$ to the first stage 1, as determined by the respectively associated code select switches S1 through $Sn-1$; switches S1 – $Sn-1$ of FIGS. *5a*, *5b*, *5c* are represented in e.g., FIG. 4 by code select switches 118 and determine the PN component codes, or, in this example, M-sequences, that are generated by component code generators 100, 102, – 104. As an example, with component code generator 100 of FIG. *5a* having switch S1 opened and switch S2 closed and with an initial content of all "1"'s in stages 1, 2, 3, successive clock pulses 120 at PN bit times $t_1$ – $t_7$ cause component code generator 100 to generate and emit from its last stage, $n = 3$, the M sequence 1010011 of seven bits in length which M-sequence is cyclically emitted therefrom as indicated by Table A. Likewise, the illustrated opened, or closed, status of switches S1 – $Sn - 1$ of component code generators 102, 104 as noted in FIGS. *5b*, *5c*, respectively, causes component code generators 102, 104 to generate and emit from their last stages, $n = 4$, $n = 5$, respectively, the M sequences and 111000100110101 of 15 bits in length, 1110001101110101000010010110011 of 31 bits in length, respectively. With particular reference to FIG. 8 these M-sequence component codes, as generated by component code generators 100, 102 – 104, respectively, are noted as component codes A, B, – K wherein the high level signal represents a "1" and the low level signal represents a "0".

FIG. 8 illustrates, at a PN bit time base where one sample-and-hold pulse occurs at a frequency $f_2 = f_1/N$, ($N = 11$), an initial small portion of the cyclical sequence, for FIG. 4, of component codes A, B, – K which are the inputs to MAJ code combiner 106 and the modulation, or division, thereof by the associated binary sample-and-hold devices 110, 112, 114 generating the component codes A', B', – K', respectively, which are the inputs to MAJ' code combiner 108. FIG. 8 likewise illustrates the cyclical sequence, for FIG. 3, of component codes A, B, – K generated by component code generators 80, 82, 84, respectively, which are the inputs to MAJ code combiner 86 and of component codes A', B', – K', generated by component code generators 90, 92, 94, respectively, which are the inputs to MAJ' code combiner 96.

Figure 9:
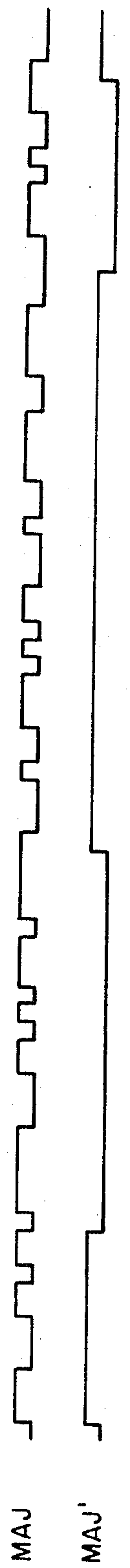
FIG. 9 is an illustration of the composite code MAJ derived from the component codes of FIG. 8.

With particular reference to FIG. 9 there are illustrated, at the same PN bit time base as FIG. 8, the binary signal wave forms of the outputs of the code combiners that are associated with FIGS. 3 and 4. Table D presents the truth table of the logical operation performed by the code combiners utilized in FIGS. 3 and 4.

Figure 10:
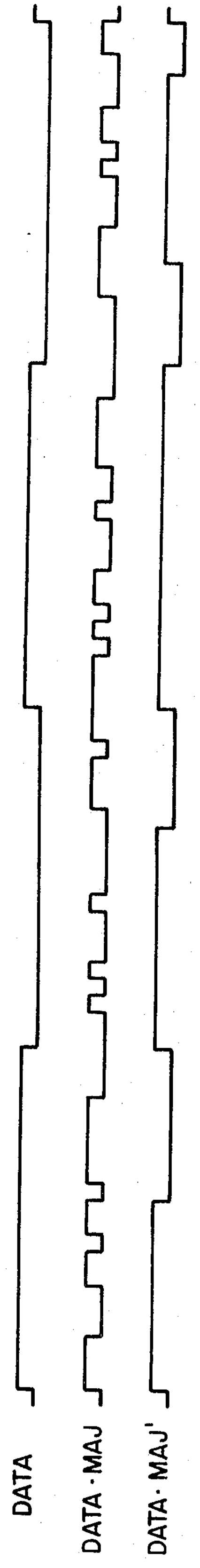
FIG. 10 is an illustration of the digital data signal data that is to be modulated by the composite codes MAJ and MAJ'.

With particular reference to FIG. 10 there is presented an illustration, where one data bit time equals 20 PN bit times, of the digital data signal that is to be transmitted and the modulation thereby of the MAJ and MAJ' composite codes of FIG. 9. FIG. 10, using the same time base as that of FIGS. 8, 9, illustrates that the MAJ (MAJ') composite code is modulated by the digital data signal; if the digital data signal is of a high level, representative of a "1", it provides a true output of the MAJ (MAJ') composite code while if of a low level, representative of a "0", it provides the complement of the MAJ (MAJ') composite code.

Figure 11:
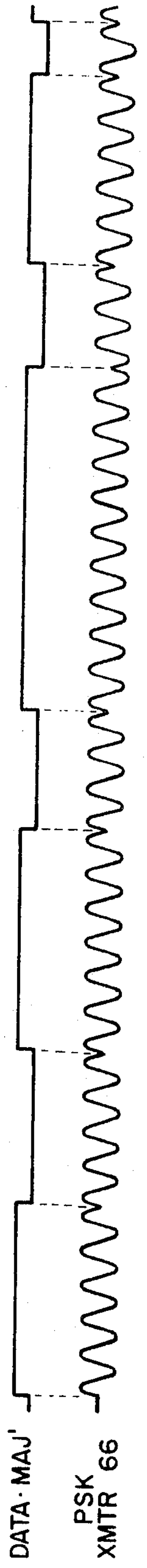
FIG. 11 is an illustration of the PSK modulation of the carrier signal by the modulated digital data signal data—MAJ of FIG. 10.

With particular reference to FIG. 11 there is presented an illustration, at the same time base as FIGS. 8, 9, 10, of the PSK modulation of the carrier signal by the modulated digital data signal DATA-MAJ' of FIG. 10. The RF carrier signal of FIG. 11 is illustrated as being on the same time base as FIG. 10, being at a frequency $f_c$ of approximately $f_1/2$, the number of carrier signal cycles illustrated in FIG. 11 being for illustrative purposes only, no limitation thereto intended.

Figure 12:
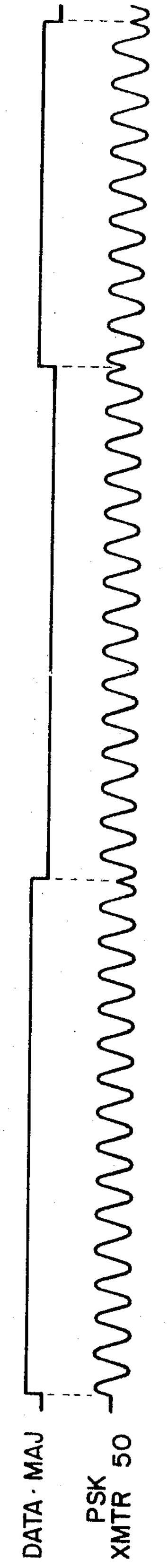
FIG. 12 is an illustration of the PSK modulation of the carrier signal by the modulated digital data signal DATA—MAJ' of FIG. 10.

With particular reference to FIG. 12 there is presented an illustration, with the time base being 10 times that of FIGS. 8, 9, 10, 11, of PSK modulation of the carrier signal by the modulated digital data signal DATA-MAJ of FIG. 10. The RF carrier signal of FIG. 12 is illustrated as being on a different time base than FIG. 11, being at a frequency $f_c$ of approximately $f_1/10$, the number of carrier signal cycles illustrated in FIG. 12 being for illustrative purposes only, no limitation thereto intended.

It is to be understood that the signals of FIGS. 11, 12 are presented for illustrative purposes only, PSK modulation being only one of several ways in which the RF carrier may be modulated by a PN sequence. The implementation is performed by the receivers of FIGS. 3 and 4 for the demodulation of the received signal and by the transmitters of FIGS. 3 and 4 for the modulation of the carrier signal, such procedures being performed in well-known manners.

Thus, it is apparent that applicants have presented a novel two-clock-frequency PN generator providing an improved digital data two-way communication system utilizing different clock-frequency pseudo-noise modulated RF transmission signals.

What is claimed is:

1. A communication system, comprising:

first and second transmit/receive stations;

each of said first and second stations including an associated transmitter means and an associated receiver means;

each of said first and second stations including an associated two clock-frequency PN generator means for generating a first PN code of a bit frequency $f_1$ and a second PN code of a bit frequency $f_2$, where $f_1 = Nf_2$ with N being a positive integer greater than one;

each of said PN generator means of said first and second stations controlling the associated receiver and transmitter for enabling said first and second stations to transmit to said second and first stations, respectively, at said different PN clock frequencies $f_1$ and $f_2$, respectively.

2. The communication system of claim 1 wherein said modulation is phase-shift-keyed.

3. A communication system, comprising:

first and second transmit/receive stations;

each of said first and second stations including an associated transmitter means and an associated receiver means;

each of said first and second stations including associated first and second PN generator means for generating a first PN code of a PN bit frequency $f_1$ and of a PN bit time ($1/f_1$) and a second PN code of a PN bit frequency $f_2$ and of a PN bit time ($1/f_2$), where $f_1 = Nf_2$ with $N$ being a positive integer;

means coupling the first and second PN codes generated by said first stations's PN generator means to the associated transmitter means and the associated receiver means, respectively, for controlling said associated transmitter means to modulate a to-be-transmitted carrier signal with a PN signal generated at a clock-frequency $f_1$ and for controlling said associated receiver means to demodulate the transmission signal received from a said second station which signal was modulated by a PN signal generated at a clock-frequency $f_2$;

means coupling the first and second PN codes generated by said second station's PN generator means to the associated receiver means and the associated transmitter means, respectively, for controlling said associated receiver means to demodulate the transmission signal received from said first station which signal was modulated by a PN signal generated at a clock-frequency $f_1$ and for controlling said associated transmitter means to modulate a to-be-transmitted carrier signal with a PN signal generated at a clock-frequency $f_2$;

each of said PN generator means of said first and second stations controlling the associated receiver and transmitter for enabling said first and second stations to transmit signals to said second and first stations, respectively, which signals are modulated by PN signals generated at said different clock frequencies $f_1$ and $f_2$, respectively.

* * * * *